United States Patent Office 2,941,611
Patented June 21, 1960

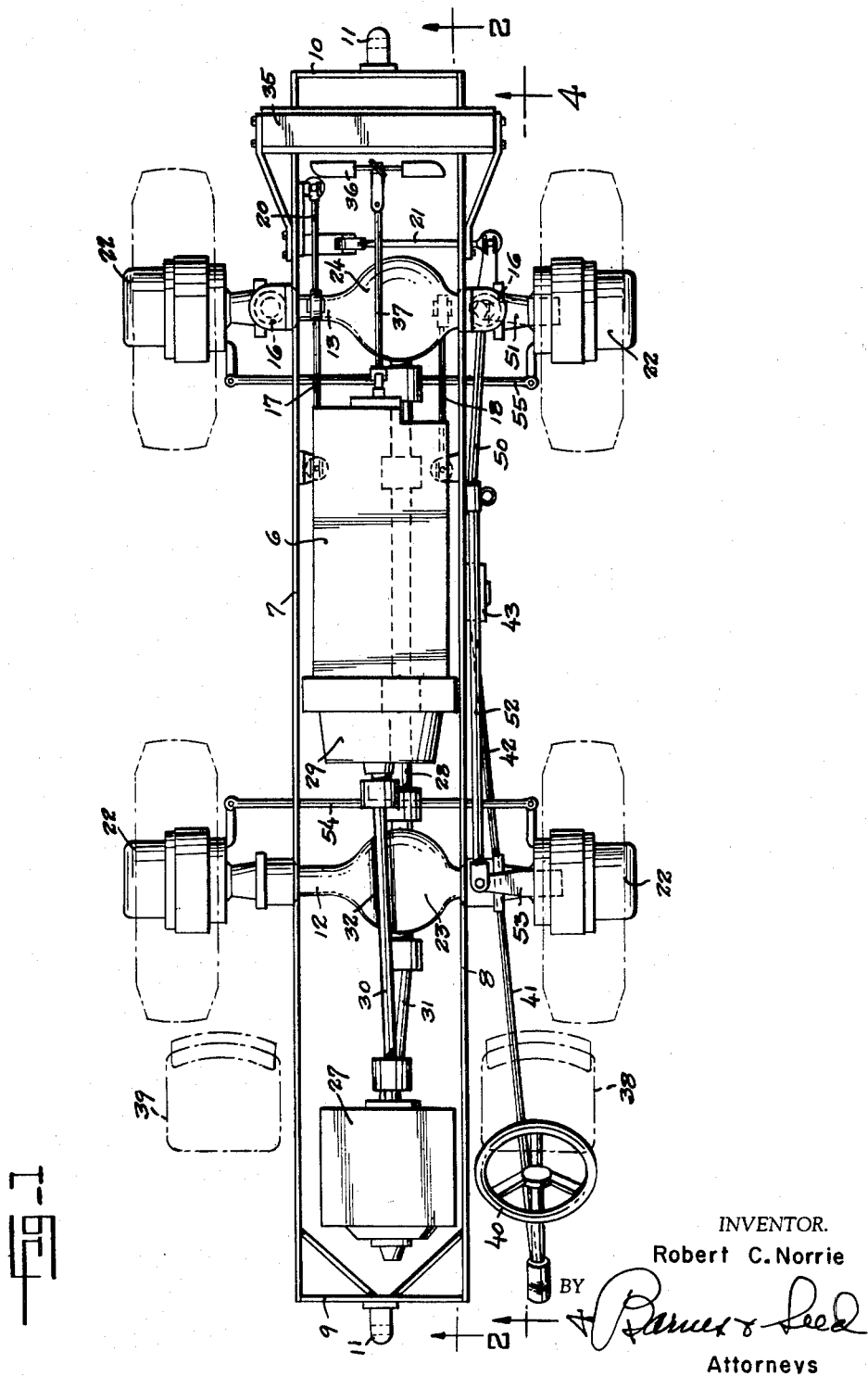

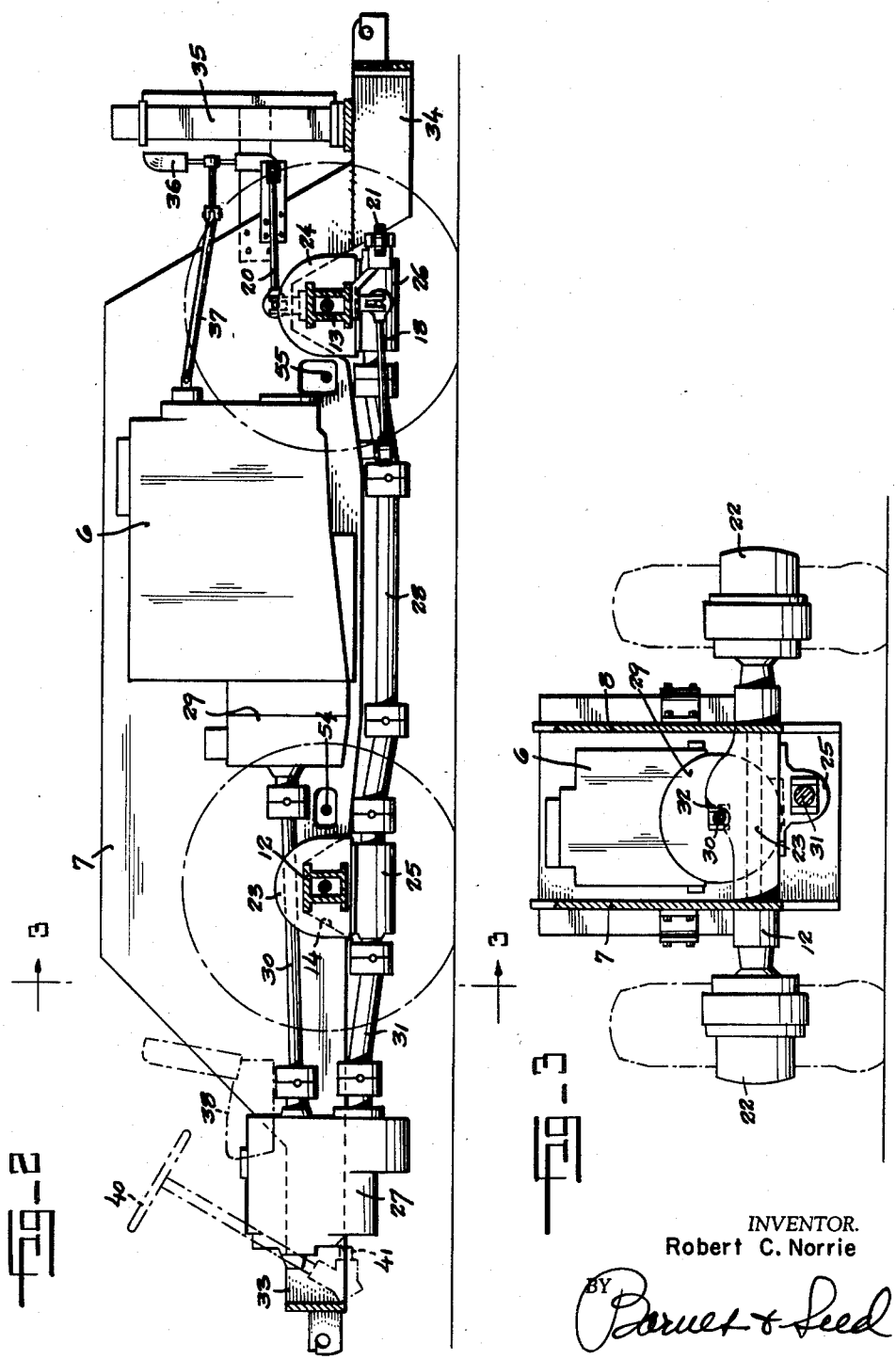

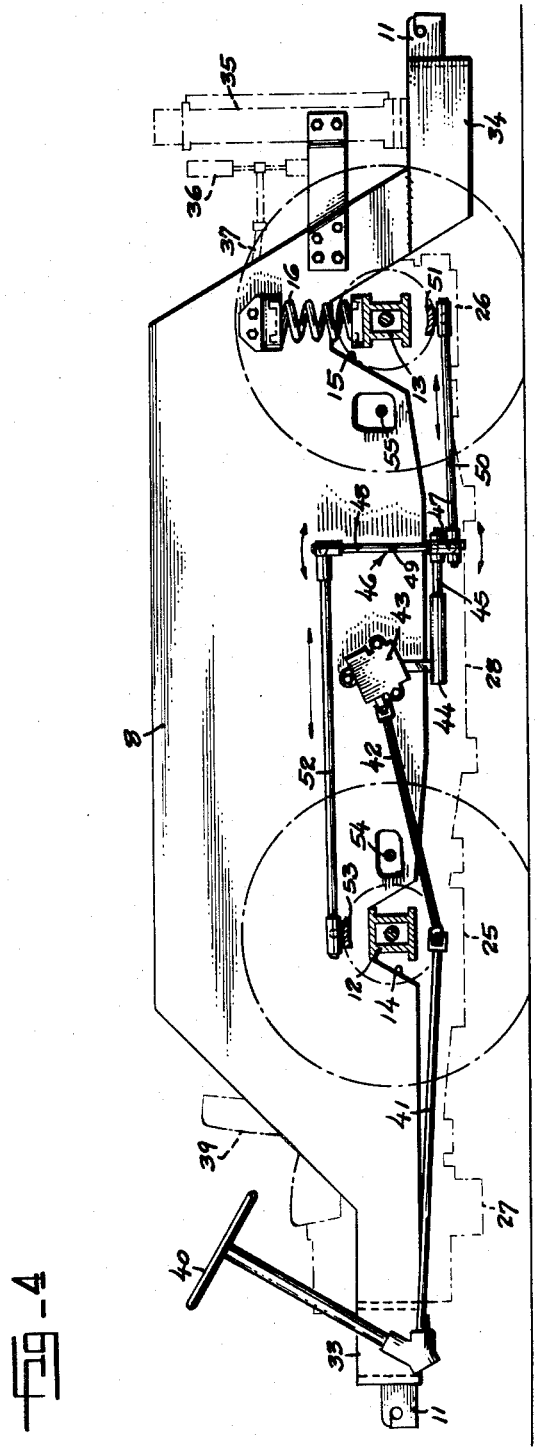

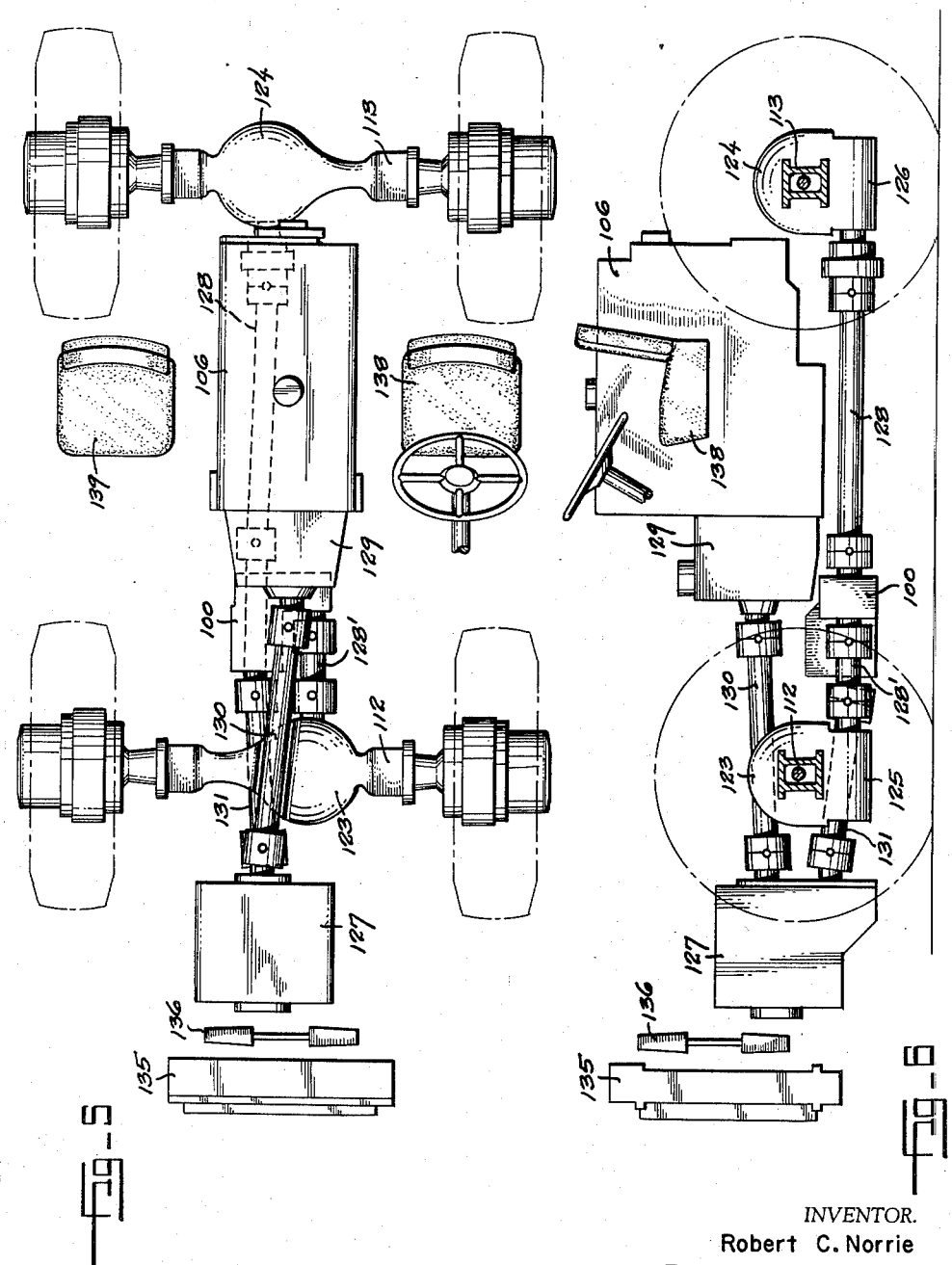

2,941,611

TOWING TRACTOR FOR AIRPLANES

Robert C. Norrie, Seattle, Wash., assignor to Pacific Car and Foundry Company, Seattle, Wash., a corporation of Washington Filed Nov. 14, 1957, Ser. No. 696,528

4 Claims. (Cl. 180—45)

This invention relates to a towing tractor, and particularly a tractor for moving heavy airplanes such as bombers and commercial and military transports during periods while the same are on the ground. Many problems must be met in designing a satisfactory tow car for the described purpose. One such problem is provision of a sufficiently low silhouette to permit a tow car to move freely below the chassis of the airplane. Another problem is to obtain rigidity while at the same time providing sufficient flexibility to insure effective traction. Yet another problem is to provide a short turning radius with comparatively rapid action in moving the wheels from a hard-over position in one direction to a hard-over position in the opposite direction. Still another problem is to easily accommodate the tow car to greater or lesser traction burdens in order that the tow car will readily adapt itself to varying conditions as well as different types and sizes of airplanes, which obviously impose greater or less resistance upon the tow car. It is the object of the invention to provide a tow car meeting these and other problems and which is otherwise efficient in operation and simple in construction. The invention consists in the novel construction and in the adaptation and combination of parts hereinafter described and claimed.

In the accompanying drawings, which somewhat schematically illustrate the chassis of two embodiments of a tow car constructed to embody the preferred teachings of the present invention:

Figure 1 is a top plan view of one of said embodiments.

Fig. 2 is a longitudinal vertical sectional view drawn on line 2—2 of Fig. 1.

Fig. 3 is a transverse vertical sectional view on line 3—3 of Fig. 2.

Fig. 4 is a longitudinal vertical sectional view drawn on line 4—4 of Fig. 1; and Figs. 5 and 6 are a top plan view and a longitudinal vertical sectional view of the other said embodiment, deleting the frame and the suspension system therefor as well as the steering connections to the wheels, all of which are or may be the same as shown in Figs. 1 through 4.

Referring to said drawings the numerals 7 and 8 designate the longitudinal principals of a vehicle frame, such principals being comprised of steel plates positioned on edge and extending parallel to one another at opposite sides of the longitudinal median line, the spacing between said framing principals being little more than the width of an engine, designated by 6, which occupies a position between the same and is suitably supported thereby. Said principals are connected at each end of the frame by transverse members 9 and 10 complemented by stiffening gussets. Tow-hitches 11 are made rigid with such frame at the front and rear thereof. Longitudinally considered, the engine lies between front and rear axles 12 and 13. Both such axles occupy jump cut-outs, as 14 and 15, provided along the bottom edges of the frame principals, with the forward axle being bolted solidly to the plates. The rear axle is sprung on coil springs 16, and is positioned by a set of torque rods. Two such rods, designated by 17 and 18, occupy parallel positions below the plane of the axles one at one side and the other at the other side of the longitudinal median line immediately to the inside of the related framing principal, being attached by their rear ends to the axle while the front ends are attached to the frame. A third torque rod 20 overlies and extends rearwardly from the axle with its front end attached to the axle and its rear end attached to the frame. A fourth torque rod 21 extends transversely of the frame to the rear of the rear axle, with its two ends, or more especially the pivot centers therefor, localized one with respect to the axle and the other with respect to the frame.

Each of said axles is a steering axle and in the outer steering ends 22 embodies planetary reduction gearing. Centrally placed worm differential carrier assemblies for the two axles provide further reduction in the drive.

The bowls, as 23 and 24, for said differential assemblies are each invertedly mounted. This serves the important end of locating the worm carriers 25 and 26 (Fig. 2) at the underside and thus permits an unusually low vehicle silhouette in that power passed by a drive line 28 from the forward to the rear differential is trained below the axles and consequently permits the engine to be positioned at a correspondingly lowered level. An ancillary end which is accomplished by the inverted mounting of said differential bowls in ease of servicing, permitting the carriers to be dropped into a pit and directly exposing the gearing contained in the bowl. The outer ends of each axle, and which is to say the steering ends, can be unbolted from the axle housings so that these parts can likewise be serviced without removing the main axles from the chassis.

The drive train from the engine to said axles includes a torque converter 29 boltably secured to the engine at the front end of the latter, and a 3-speed transmission 27 supported between the plates at the front end of the frame. Power from the output end of the converter is carried forwardly by a drive shaft 30 along an upper level into the input end of the transmission, and from the transmission is carried rearwardly by a drive shaft 31 along a lower level to the worm carrier 25 of the front differential. The top side of the differential bowl 23 is notched, as at 32, to permit the drive line 30 to be lowered below the normal profile of such bowl.

Throughout the greater part of the vehicle's length, said frame-forming principals 7 and 8 have a considerable width, extending from approximately the low limit of the axles to the upper limit of the engine. At each end, these principals narrow down and along the bottom are prolonged fore and aft by tongue sections 33 and 34. A radiator 35 for the engine and converter derives its support from the aft tongues. A fan 36 associated with such radiator is powered by an engine-driven shaft 37. While not here illustrated outrigger frames are provided at the front end of the vehicle at each side of the main frame. Seats 38 and 39 for the driver and an aide are sustained by these outrigger frames.

Power steering is provided. From the steering wheel 40, control motions are passed by connected shafts 41 and 42 to a steering gear 43. A control valve 44 responding to this gear imparts fore-and-aft motion to a link 45 which connects with one leg 47 of a vertical swing-lever 46 pivoted at 49 to the frame for rocker motion about a centrally disposed horizontal axis. A rod 50 connects said leg 47 with the steering arm 51 for one of the two back wheels, and a rod 52 connects the other leg 48 with the steering arm 53 for one of the two front wheels. Tie-rods, as 54 and 55, connect the steering arms at one side with the steering arms at the other side of the vehicle.

While not shown in the drawings, weighting of the towing tractor to meet the particular traction requirement for any given airplane is accomplished by loading the frame with steel or iron slabs. With the traction burden provided by these slabs the tug may then weigh two or more tons. The weight without such burden is approximately half this figure. The slabs may be applied in any manner desired, preferably by bolting the slabs to the framing principals 7 and 8 along the outside of the latter. It will be understood that a body like or similar to that shown in design patent application Ser. No. 47,252, filed August 6, 1957, and since issued as Design Patent No. 183,105 is provided for the tractor, such body being paneled to allow servicing of the units.

In the modified arrangement illustrated in Figs. 5 and 6, the radiator here designated by 135, and its fan 136, are placed at the front rather than the rear extreme, and the seats 138 and 139 are located amidships, so to speak, between the front and rear axles which are denoted by 112 and 113. The fan is or may be driven by a line shaft (not shown) running directly from a power take-off at the front of the engine. The basic change lies in the employment of a power divider 100 occupying a position between the axles in the approximate horizontal plane occupied by worm carriers 125 and 126 which, like the carriers 25 and 26, are boltably secured to the underside of invertedly mounted differential bowls 123 and 124. The engine 106 passes its power forwardly by a drive shaft 130 and on a level above the front axle from an engine-driven converter 129 to a transmission 127 lying at the front of the front axle immediately behind the radiator and fan. From the transmission a drive shaft 131 passes the power rearwardly on a level below the front axle into the power divider. From the power divider shafts 128¹ and 128 carry the drive forwardly and rearwardly, respectively, into the worm carrier 125 and the worm carrier 126 as shown in Fig. 6.

The advantages of the invention will, it is thought, have been clearly understood from the foregoing detailed description of the illustrated preferred embodiments. Minor changes will suggest themselves and may be resorted to without departing from the spirit of the invention, wherefor it is my intention that no limitations be implied and that the hereto annexed claims be given a scope fully commensurate with the broadest interpretation to which the employed language admits.

What I claim is:

1. In an automotive vehicle, in combination with live front and rear axles each provided with a differential driven from below by a respective speed-reducing gear, and a vehicle frame supported by said axles and including transversely spaced apart longitudinal principals, an engine supported by said frame to occupy a position between the principals and between the axles, a transmission supported by the frame to occupy a position between the principals spaced longitudinally of the frame beyond one of the axles, a radiator supported by the frame to occupy a position between the principals spaced longitudinally of the frame beyond the other axle, a shaft driving a fan for said radiator and driven from the end of the engine facing said radiator, a shaft driven from the other end of the engine and passing power on a level above the axles to the input end of the transmission, and shafting passing power on a level below the axles from the output end of the transmission to both of the speed-reducing gears which drive the differentials of the two axles.

2. A vehicle according to claim 1 in which the frame is rigid with one axle and resiliently sustained by the other.

3. A vehicle according to claim 1, said axle which is proximal to the transmission being rigid with the frame and said other axle being resiliently sprung from the frame, and wherein said sprung axle is positioned by torque rods.

4. In an automotive vehicle, in combination with live front and rear axles each provided with a differential driven from below by a respective speed-reducing gear, and a vehicle frame supported by said axles and including transversely spaced apart longitudinal principals, an engine supported by said frame to occupy a position between the principals and between the axles, a transmission supported by the frame to occupy a position between the principals spaced longitudinally of the frame beyond one of the axles, a radiator supported by the frame to occupy a position between the principals also spaced longitudinally of the frame beyond one of the axles, a shaft driving a fan for said radiator and driven from the end of the engine facing said radiator, a shaft driven from the engine and passing power on a level above the axles to the input end of the transmission, and shafting passing power on a level below the axles from the output end of the transmission to both of the speed-reducing gears which drive the differentials of the two axles, the radiator and the input shaft to the transmission being located within substantially the vertical confines of said engine.

References Cited in the file of this patent

UNITED STATES PATENTS

| | | |
|---|---|---|
| 1,592,970 | Dernier | July 20, 1926 |
| 1,953,749 | Curtis | Apr. 3, 1934 |
| 2,104,608 | Cox et al. | Jan. 4, 1938 |
| 2,204,988 | Haltenberger | June 18, 1940 |
| 2,347,882 | Choate et al. | May 2, 1944 |
| 2,367,817 | Brown | Jan. 23, 1945 |
| 2,368,121 | Dunham | Jan. 30, 1945 |
| 2,669,317 | Celien | Feb. 16, 1954 |
| 2,714,936 | Gregory | Aug. 9, 1955 |
| 2,751,990 | Finlay et al. | June 26, 1956 |
| 2,763,331 | LeTourneau | Sept. 18, 1956 |

FOREIGN PATENTS

| | | |
|---|---|---|
| 517,465 | Great Britain | Jan. 31, 1940 |
| 576,649 | Great Britain | Apr. 12, 1946 |
| 747,610 | Great Britain | Apr. 11, 1956 |
| 495,173 | France | June 19, 1919 |
| 1,083,490 | France | June 30, 1954 |